United States Patent [19]
Rowe

[11] 4,178,764
[45] Dec. 18, 1979

[54] AIR CONDITIONING SYSTEM
[76] Inventor: Jerry R. Rowe, Rte. #2, Box 153-10, Springtown, Tex. 76082
[21] Appl. No.: 853,253
[22] Filed: Nov. 21, 1977
[51] Int. Cl.² .............................................. F25D 7/00
[52] U.S. Cl. .......................................... 62/81; 62/175; 62/176 C; 62/333
[58] Field of Search ...................... 62/333, 311, 176 C, 62/176 E, 171, 175, 91

[56] References Cited
U.S. PATENT DOCUMENTS
3,153,332 10/1964 Goettl et al. ...................... 62/176 C
3,859,818 1/1975 Goettl ..................................... 62/311

Primary Examiner—William E. Wayner
Attorney, Agent, or Firm—Wendell Coffee

[57] ABSTRACT
An air conditioning system has an evaporative cooler and a refrigerated cooler connected to a common duct connecting both of the coolers to a cooled space. A space thermostat senses space temperature of the cooled space and initiates cooling responsive thereto. A cooler selection control selects one of the coolers for cooling the cooled space responsive to the relative humidity and temperature of air outside the cooled space. The selection control delays starting of the refrigerated cooler a cool down period after the initiation of cooling. With the evaporative cooler employed in a system with, or in a system without, the refrigerated cooler, the evaporative fan is started a wetting period after the starting of the evaporative pump of the evaporative cooler to wet the evaporative pads. Additionally an exhaust vent opens when the evaporative fan of the evaporative cooler is operating and closes when the evaporative fan is stopped.

17 Claims, 5 Drawing Figures

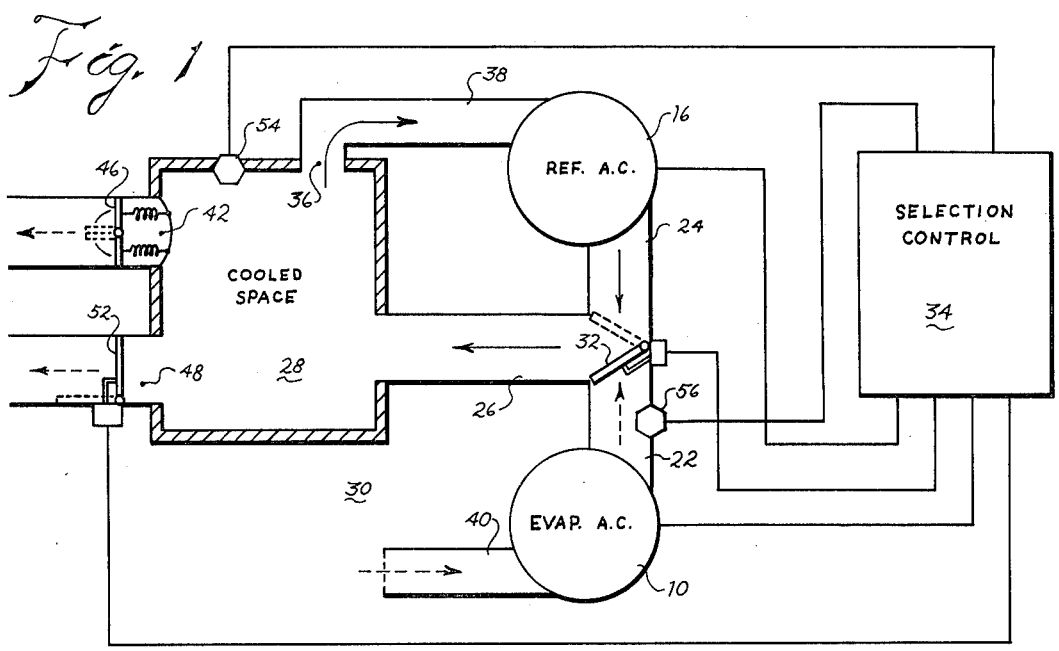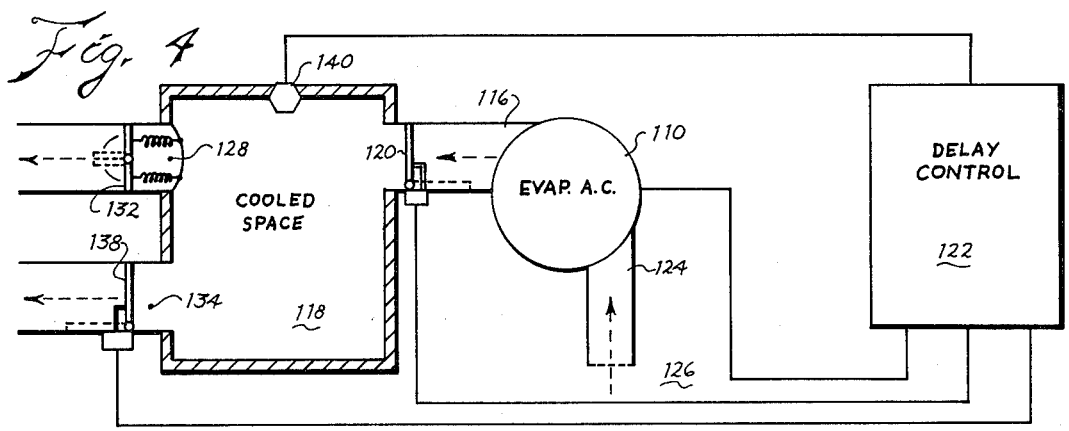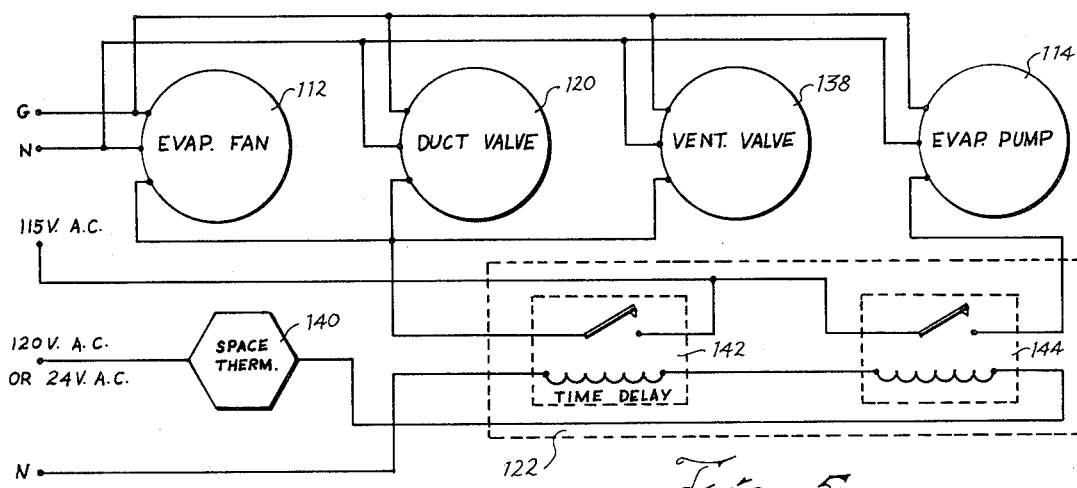

AIR CONDITIONING SYSTEM

CROSS REFERENCE TO RELATED APPLICATIONS

None. However, applicant has filed Disclosure Document No. 061,545 on June 13, 1977, which document concerns this application; therefore, by separate paper it is respectfully requested that such document be retained.

BACKGROUND OF THE INVENTION (1) Field of the Invention

This invention relates to air conditioning systems and more particularly to efficient air conditioning systems of combined refrigerated and evaporative coolers.

(2) Description of the Prior Art

Air conditioning systems which employ evaporative coolers often experience difficulty in cooling a cooled space when the relative humidity rises above a critical level. This critical level varies depending on the temperature of outside air. At this critical level, the evaporation of water from the pads of the evaporative cooler is insufficient to provide the cooling capacity desired.

Workers in the art prior to my invention have solved this problem by connecting a refrigerated cooler to the cooled space to supplement the evaporative cooling with refrigerated cooling. However, such prior systems often required manually switching from the evaporative cooler to the refrigerated cooler when high humidity necessitated additional cooling.

Applicant was aware of the following references prior to filing this application: U.S. Pat. Nos. to Goettl, 3,182,718; Mercer, 3,747,362; Goettl, 3,859,818.

SUMMARY OF THE INVENTION (1) New and useful function

I have greatly increased the efficiency and utility of air conditioning systems with refrigerated and evaporative coolers by inventing an automatic air conditioning system which automatically selects the proper cooler with which to cool the cooled space responsive to relative humidity and temperature of the outside air. Outside air will be understood to mean any air outside the cooled space, including but not limited to, attics, basements, walls and the like.

My invention initiates cooling responsive to the temperature within the cooled space, and automatically selects the proper evaporative or refrigerated cooler responsive to one of two alternative indicators of when the critical combined humidity-temperature value has been reached. By critical relative humidity and temperature conditions, I mean that combination of atmospheric vapor content and temperature which causes the evaporation of water from the evaporative pads to be so insufficient as to fail to lower the temperature of air from the evaporative cooler above the desired or effective cooling capacity.

The first alternative indicator is the temperature of air from the evaporative cooler which I call duct temperature. The duct temperature from the evaporative cooler at which evaporation from the evaporative cooler pads is no longer sufficient to provide the desired cooling capacity, I call the limit duct temperature. Once this temperature is reached it is desirable to switch to the refrigerated cooler. Thus, changes in temperature and relative humidity over a continuous range of comparative values affecting cooling capacity will be directly related to the duct temperature. By setting the limit duct temperature at a given value, switching may be efficiently accomplished responsive to the value of the duct temperature, and thence to the critical values of temperature and relative humidity described above.

The second alternative indicator is the result of taking the difference of the space temperature and the duct temperature, which I call a difference temperature. The critical value of the difference temperature which I call the limit difference temperature is measured in terms of the effective cooling capacity in relation to the space temperature. The desired cooling capacity described in connection with the first embodiment is the capacity provided by the evaporative cooler that will cool the cooled space down to a desired limit space temperature. However, when the space temperature of the cooled space is much in excess of the desired limit space temperature, the evaporative cooler, though not having the desired cooling capacity, may nevertheless provide effective cooling of the cooled space. Effective cooling capacity is that condition in which the air exhausted by the evaporative cooler may effectively cool the cooled space to a lower space temperature, which is above the desired space temperature.

Thus, for the first embodiment, if the space temperature were greatly in excess of the desired space temperature, and the humidity and temperature conditions of the outside air such that the evaporative cooler could not provide the desired cooling capacity, but could provide effective cooling for that particular space temperature, the refrigerated cooler would be employed in the first alternative to cool the cooled space during the time in which the evaporative cooler would be employed in the second alternative. The more efficient evaporative air conditioner should be used as often as possible. Therefore, the second embodiment, or difference temperature, may be seen to be more efficient in the use of the evaporative cooler. However, the first embodiment is simpler in design and operation.

It is well known in the art that an evaporative cooler does not achieve maximum cooling until after a lag time or cool down period. Thus, for each of the alternatives mentioned above, I prefer to delay the starting of the refrigerated cooler a cool down period after initiation of cooling in order to obtain a true or more accurate steady state reading of the duct temperature.

In addition, I have found that it is desirable to wet the pads of the evaporative air conditioner prior to turning on the evaporative fan. This allows the pads to be fully soaked such that when the evaporative fan is started all air pulled through the evaporative cooler will be pulled through wetted pads thereby insuring maximum cooling. If the fan were started simultaneously with the pump the air pulled through the evaporative cooler would be warm until the pads were wetted, thereby initially blowing warm air into the cooled space. Therefore, for evaporative coolers either in combination with the refrigerated coolers in the system described above or as an independent unit where the evaporative cooler alone is used to cool the cooled space and initiated thermostatically, the evaporative fan is delayed a wetting period after the starting of the evaporative pump.

Therefore, the cool down period or lag time necessary to allow the evaporative cooler to achieve maximum cooling will be the wetting period plus any additional period required to allow maximum cooling. In my invention the preferred sequence is to start the pump of the evaporative cooler to soak the pads, then to start the fan, and then after the evaporative cooler has reached a steady state cooling condition, to select the proper cooler.

Approximately simultaneous with the starting of the evaporative cooler fan a vent valve in an exhaust vent connecting the cooled space to outside air opens. A duct valve in the duct opens the connection of the evaporative cooler and blocks the connection of the refrigerated cooler to the cooled space.

For the first alternative, after the cool down period, if the duct temperature of air from the evaporative cooler is below the limit duct temperature, the evaporative cooler is left on and the refrigerated cooler is not started.

If the duct temperature of air from the evaporative cooler exceeds the limit duct temperature, the refrigerated cooler is started and the evaporative cooler is stopped. The exhaust valve closes and the duct valve in the duct opens the connection of the refrigerated cooler and blocks the connection of the evaporative coolers, to the cooled space.

For the second alternative, after the cool down period, if the difference temperature defined as the difference between the space temperature and the duct temperature, is above the limit difference temperature, the evaporative cooler is left on and the refrigerated cooler is not started. Approximately simultaneous with the starting of the fan, the vent valve in the exhaust vent connecting the cooled space to outside air opens. A duct valve in the duct opens the connection of the evaporative cooler and blocks the connection of the refrigerated cooler to the cooled space. When the difference temperature is lower than the limit difference temperature, the refrigerated cooler is started and evaporative cooler is stopped. The vent valve closes and the duct valve in the duct opens the connection of the refrigerated cooler and blocks the connection of the evaporative cooler to the cooled space.

A third embodiment of my invention includes an evaporative cooler connected by a duct to a cooled space. A space thermostat initiates cooling by the evaporative cooler. A delay control delays the starting of an evaporative fan of the evaporative cooler a wetting period after the starting of an evaporative pump of the evaporative cooler. This structure and method provides for greater efficiency in air conditioning systems having a single thermostatically controlled evaporative cooler.

Therefore, by providing automatic switching between the evaporative and refrigerated coolers and employing the appropriate cool down period, I have invented an air conditioning system having much greater utility and efficiency than previous systems. In addition, by providing the wetting period, I have accomplished more efficient starting of evaporative coolers.

Thus, the total functioning of my invention exceeds the sum of the functions of the individual components thereof, i.e., ducts, coolers, thermostats, valves, etc.

(2) Objects of the Invention

An object of this invention is to efficiently cool a cooled space.

Another object of this invention is to employ the species of air conditioner most suitable for given conditions.

Another object of this invention is to efficiently start an evaporative cooler.

Further objects are to achieve the above with a device that is sturdy, compact, durable, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

DESCRIPTION OF THE DRAWING

FIG. 1 is a schematic representation of an embodiment of my invention.

FIG. 4 is a schematic representation of a third embodiment of my invention.

FIG. 5 is an electrical block diagram thereof.

DESCRIPTION OF THE PREFERRED EMBODIMENTS

Figure 2:
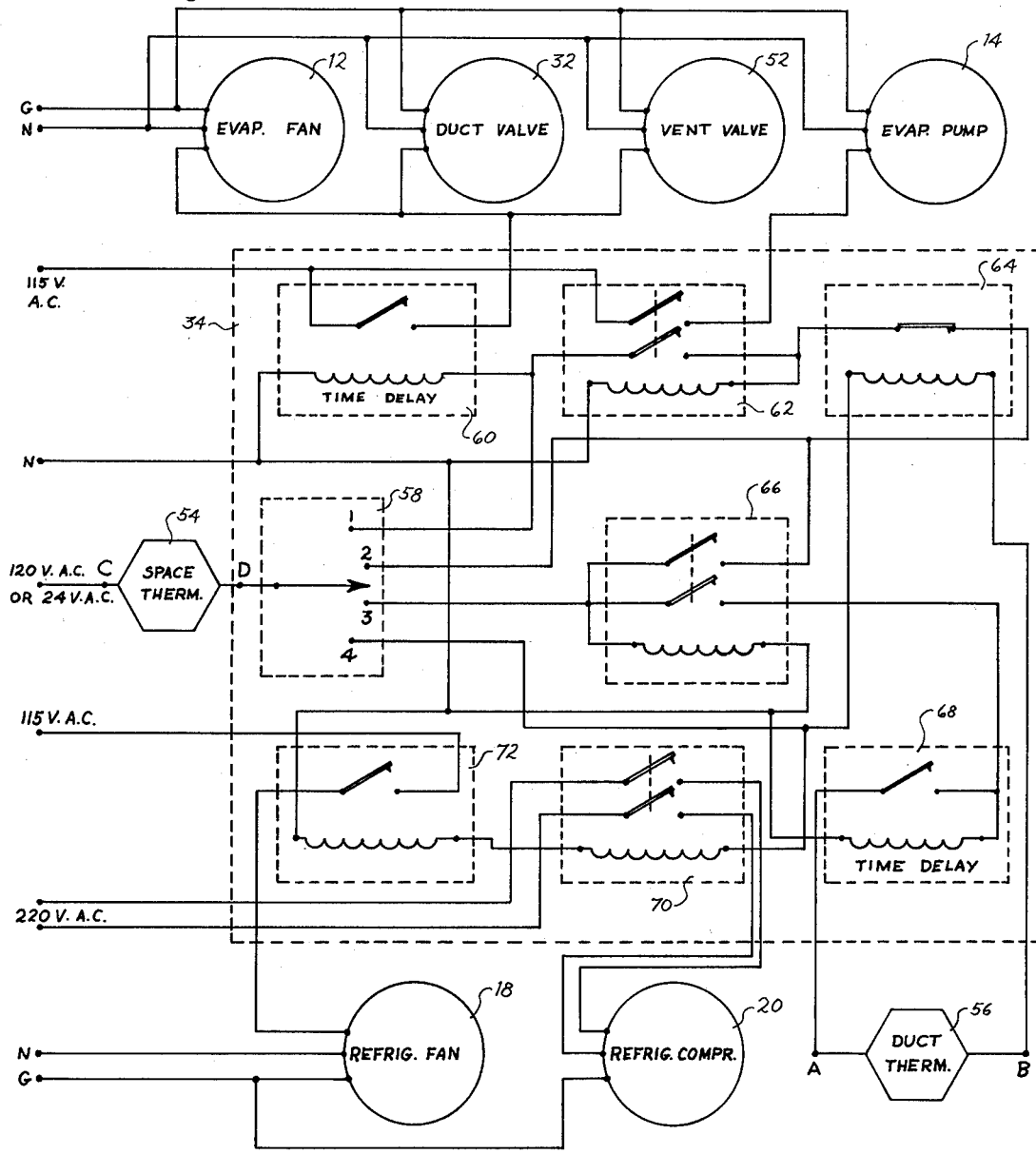
FIG. 2 is an electrical block diagram thereof.

Referring to both FIGS. 1 and 2, evaporative cooler 10 is a common evaporative air conditioner having evaporative fan 12 which draws air through pads (not shown), which are soaked with water pumped by evaporative pump 14 from a sump (not shown). Refrigerated cooler 16 is a common refrigerated air conditioner having a refrigerated fan 18 which draws air around cooling coils (not shown) which have coolant forced through them by refrigerated compressor 20. These structural items are not shown in detail but are merely represented in block form to avoid unnecessarily complicating the drawing inasmuch as these items are well known and common in the art.

Evaporative duct 22 and refrigerated duct 24 each connect the evaporative cooler 10 and the refrigerated cooler 16, respectively, to common duct 26. The common duct 26 connects the ducts 22 and 24 and, therefore, the coolers 10 and 16 to cooled space 28. Outside air 30 is that air outside the cooled space 28. It will be understood that outside air could include an attic above the cooled space or basement below the cooled space. By cooled space, I mean that air within a closed volume, such as a room or house. The common duct 26, refrigerated duct 24 and evaporative duct 22, together, form a duct or connection of each of the coolers 10 and 16 to the cooled space 28.

Duct valve 32 is mounted at the intersections of the ducts 22, 24 and 26. The duct valve 32 provides for blocking either of the ducts 22 and 24 from the common duct 26. The duct valve is controlled by cooler selection control 34. The duct valve 32 with the selection control 34 provides for blocking the refrigerated duct 24 and opening the evaporative duct 22 when the evaporative fan 12 is operating, and blocking the evaporative duct 22 and opening the refrigerated duct 24 when the refrigerated fan 18 is operating. Therefore, the duct valve 32 is a mechanism for blocking the connection of one of the coolers and opening the connection of the other cooler when the other cooler is operating.

Intake valve 36 connects the cooled space 28 to refrigerated intake 38 of the refrigerated cooler 16. Evaporative intake 40 is connected to the outside air 30. Therefore, it may be seen that the refrigerated cooler 16 intakes air from the cooled space 20 and exhausts it into the cooled space 20. There will be little, if any, pressure change within the cooled space 20 when the refrigerated cooler 16 is operating.

However, when the evaporative cooler 10 is operating air is taken from the outside air 30 and exhausted into the cooled space 28. Therefore, for effective transfer of air to take place from the outside air 30 to the cooled space 28 there must be a way to relieve the pressure generated by the evaporative cooler fan 12 within the cooled space 28.

Exhaust vent 42 has pressure relief vent valve 46 in the cooled space. The vent valve 46 opens when the pressure within the cooled space exceeds a given pressure. The given pressure is greater than the pressure generated by operation of the refrigerated cooler or by a heating system employed during cooler seasons. Thus, the exhaust vent 42 permits efficient operation of the evaporative cooler 10 while insuring that efficient operation of other units is unaffected.

Exhaust vent 48 is an alternative to the exhaust vent 42 or it may be used in conjunction therewith. The exhaust vent 48 has electrically controlled vent valve 52 therein. The electrically controlled vent valve 52 is controlled by the selection control 34, such that the vent valve 52 is opened when the evaporative fan 12 is operating and closed at all other times. Thus, exhaust vent 48 provides for more positive control over opening and closing than does exhaust vent 42. Each of the vents 42 and 48 and the valves 46 and 52 therein provide for venting the cooled space 28 of the outside air 30.

The cooled space 28 has space thermostat 54 therein. The space thermostat 54 is connected to the cooler selection control 34. The space thermostat 54 senses a space temperature and transmits temperature data to the cooler selection control 34. Duct thermostat 56 is located in the evaporative duct 22 and is connected to the cooler selection control 34. The duct thermostat 56 senses the temperature of air exhausted by the evaporative cooler 10 and transmits this data to the cooler selection control.

It will be understood, that as used herein thermostat includes any means of sensing temperature and electrically communicating it and including, but not limited to: contact switch thermostats, mercury switch thermostats, bimetallic thermostats, thermocouples and any other device sensing temperature over a range of temperature.

The cooler selection control 34 provides a means for initiating cooling responsive to the temperature of the cooled space and for switching between the evaporative and refrigerated coolers 10 and 16 responsive to the relative humidity of the outside air 30 and the temperature of the outside air 30. It is well known in the art that the effectiveness of evaporative coolers is in great measure dependent upon the humidity and temperature conditions of the intake air. With high humidity conditions evaporation from the cooling pads is often insufficient to provide the desired cooling capacity. By desired cooling capacity, I mean that temperature of air from the evaporative cooler which will effectively lower the temperature of the cooled space to a desired space temperature.

It is well known in the art that an evaporative cooler has a lag time or cool down period during which the pads become soaked and enough evaporation occurs to cool the air exhausted into the room. Therefore, it is necessary to delay the choice of cooler by the selection control 34 until after the evaporative cooler 10 has reached a steady state cooling condition (after the cool down period). I have also found that it is desirable to soak the pads before starting the evaporative fan, inasmuch as air drawn through the unsoaked pads will be warm air, which is undesirable. Therefore, I prefer to soak the pads a wetting period before starting the evaporative fan. Thus, I have found the following sequence to be particularly desirable. First, start the evaporative pump and operate it for a wetting period. Second, start the evaporative fan and operate the evaporative cooler 10 for the cool down period, which is inclusive of the wetting period. Third, choose between the evaporative and refrigerated coolers responsive to the temperature and humidity conditions of the outside air 30.

I have found two embodiments particularly useful in accomplishing these steps. In addition, I have found that a third embodiment which describes an air conditioning system having only an evaporative cooler may effectively employ the wetting period to good advantage.

Particularly, the first two embodiments include alternative modes of operation. I.e., operation of the evaporative fan 12 alone, operation of evaporative cooler 10 alone, automatic switching operation (as described previously), or operation of the refrigerated cooler 16 alone.

It will be understood that my invention, as described, may also be connected with existing heating systems and the like. Those with ordinary skill in the art could employ the necessary duct work and electrical connections to existing thermostats to adapt each embodiment disclosed herein to existing heating systems and the like. The specific structure of the duct work, coolers and the like have not been disclosed or described for clarity and brevity of the description. However, it is submitted that those with ordinary skill in the art could make and use the invention with the necessary duct work, valves, etc., as such elements are commercially available and common to the art.

The operator of the system may select a limit space temperature at which he desires the cooled space to be maintained. The space thermostat senses space temperature of the cooled space. If the space temperature is below the limit space temperature, cooling is not initiated. However, if the space temperature is in excess of the limit space temperature, the space thermostat signals to the selection control 34 that cooling must be initiated. This initiation means for initiating cooling when the space temperature exceeds a limit temperature is common to all three embodiments.

The first two embodiments concern air conditioning systems shaving an evaporative cooler and a refrigerated cooler. The first embodiment employs the duct temperature sensed by the duct thermostat 56 to directly relate the humidity and temperature conditions of the outside air 30 to accomplish switching between the coolers 10 and 16. A limit duct temperature (which may be manually set) is that temperature at which the evaporative cooler 10 is operating at below the desired cooling capacity and, therefore, it is desirable to switch to the refrigerated cooler to obtain the desired cooling capacity. When the duct temperature is below the limit duct temperature the cooler is operating at above the desired cooling capacity and is left on.

The second embodiment employs a differential temperature, namely the difference between the space temperature and the duct temperature to accomplish switching. The difference between the space temperature and duct temperature is called a difference temperature. Switching is accomplished when the evaporative cooler may no longer provide effective cooling capacity. Effective cooling capacity is that condition in which the air exhausted by the evaporative cooler may effectively cool the cooled space to a lower space temperature, even if above the desired space temperature. For relatively high space temperatures, although the evaporative cooler is not at a desired cooling capacity, the capacity of the evaporative cooler may be such that the high space temperature may be decreased by the evaporative cooler prior to employment of the refrigerated cooler. It will be understood that it is most advantageous to operate the more efficient evaporative cooler as much as possible for cooling. Therefore switching should be accomplished when the evaporative cooler 10 may no longer effectively cool the cooled space 28, which I prefer to call a limit difference temperature. Thus, each of the selection controls for both embodiments described hereafter are switching means for switching between the evaporative and refrigerated coolers responsive to the relative humidity and temperature of the outside air.

The first embodiment shown in FIG. 2 includes the evaporative fan 12, duct valve 32, vent valve 52, space thermostat 54, duct thermostat 56, refrigerated fan 18 and refrigerated compressor 20. Each of these elements are electrically connected to the selection control 34 outlined in dotted lines. A source of power, which may be 120 v AC or 24 v AC is connected to the input of the space thermostat. The output of the space thermostat is connected to selector switch 58. The selector switch has four terminals and is manually operated. An on-off switch is provided either in the space thermostat 54 or selector switch 58.

Fan start relay 60 is a single pole time delay relay. The input of the fan start relay 60 is connected a power source. I prefer to employ 115 v AC. The output of the fan start relay is connected to the input terminals of the evaporative fan 12, duct valve 32 and vent valve 52. The necessary ground "G" and neutral leads "N" are connected to the evaporative fan, duct valve, vent valve and evaporative pump 14 as indicated in FIG. 2. The control input of the fan start relay 60 is connected to terminal number 1 of the selector switch 58. The control output of the fan start relay 60 is connected to neutral lead "N" of the control circuit of the selection control 34.

Evaporative pump start relay 62 is double pole relay. A first input of the pump start relay is connected to the same power source as the input of the fan start relay 60. A first output of the evaporative pump start relay 62 is connected to an input terminal of the evaporative pump 14. A second input of the evaporative pump start relay 62 is connected to an output of evaporative stop relay 64. An input of the evaporative stop relay 64 is connected to terminal number 2 of the selector switch 58.

A control input of evaporative pump relay 62 is connected to the input of the second switch of the evaporative pump relay 62. A control output of the evaporative pump relay 62 is connected to the neutral lead "N" of the control circuit.

Evaporative start relay 66 is a double pole relay. The first and second inputs and the control input of the evaporative start relay 66 are connected to terminal number 3 of the selector switch 58. The first output of the evaporative start relay 66 is connected to the input of the evaporative stop relay 64. The second output of the evaporative start relay 66 is connected to the input of cool down relay 68. Cool down relay 68 is a single pole time delay relay with the control input connected to the input of the cool down relay 68.

The control output of cool down relay 68 is connected to the neutral terminal "N" of the control circuit. The output of the cool down relay 68 is connected to the input of the duct thermostat 56. The output of the duct thermostat 56 is connected to the control input of the evaporative stop relay 64. The control output of the evaporative stop relay 64 is connected to the control input of refrigerated compressor relay 70. The refrigerated compressor relay 70 is a double pole relay. The first and second inputs of the refrigerated compressor relay 70 are connected to a 220v AC power source. It is common for refrigerated compressors to employ such power, however, my invention or this embodiment are not so limited. The output of the first and second switches of the refrigerated compressor relay 70 are connected to the input terminals of the refrigerated compressor 20. The control output of the compressor relay 70 is connected to the control input of refrigerated fan relay 72. The refrigerated fan relay 72 is a single pole relay. The input of the refrigerated fan relay 72 is connected to a 115v AC power source and the output of the refrigerated fan relay 72 is connected to the input of the refrigerated fan 18. A suitable neutral terminal "N" for the refrigerated fan and ground terminal "G" for the refrigerated fan and refrigerated compressor are provided as shown.

The control output of the refrigerated fan relay 72 is connected to neutral terminal "N" of the control circuit. It is apparent that the control output of the evaporative stop relay 64 could be connected to both of the control inputs for the refrigerated compressor and refrigerated fan relays 70 and 72, and the control output of the refrigerated relays 70 and 72 connected to the neutral lead "N".

Terminal number 4 is connected to the control input of compressor relay 70. Therefore, with the circuit assembled as described and the elements connected thereto, the following functioning of the first embodiment may be seen to occur. With the selector switch connecting terminal number 1 to the output of the space thermostat, when the space temperature exceeds the desired space temperature a current will be provided through terminal number 1 to the control input of the evaporative fan relay 60, thereby closing the switch in the evaporative fan relay 60, and starting the evaporative fan 12, opening the evaporative duct 24 and closing the refrigerated duct 22 with duct valve 32 and opening the vent valve 52. Therefore, with the selector switch at terminal number 1, only the evaporative fan is operated.

With the selector switch 58 connecting the terminal number 2, when the space temperature exceeds the desired space temperature, current will be supplied through terminal number 2 and thereby through the evaporative stop relay 64 to the control inputs of the evaporative fan and evaporative pump relays 60 and 62. The pump 14 will start immediately, while the evaporative fan 12 will be delayed the wetting period by the time delay feature of the evaporative fan relay 60. After the wetting period, the switch in the fan start relay 60 will close, thereby starting the evaporative fan 12, opening the evaporative duct 24 and closing the refrigerated duct 22 with the duct valve 32, and opening the vent valve 52. Therefore, with the selector switch at terminal number 2 only the evaporative cooler is operated.

With the selector switch 58 connecting the terminal number 3, when the space temperature exceeds the desired space temperature, current will be supplied to the control of the evaporative start relay 66, thereby closing the switches in the evaporative start relay and supplying current to the control input of cool down relay 68 and to the evaporative pump and evaporative fan as described with respect to terminal number 2. The evaporative pump 74 will operate to wet the pads. After the wetting period, the evaporative fan 12 will start, the evaporative duct will be opened and the refrigerated duct closed by the duct valve 36, and the vent valve 52 will open. The evaporative fan 12 will operate for the remainder of the cool down period during which time the cool down relay 68 will delay the connection of power to the duct thermostat 56.

After the expiration of the cool down period, the cool down relay 68 will close the switch in the cool down relay 68, thereby connecting power to the duct thermostat 56. If the duct temperature is below the limit duct temperature, current *will not* be connected to the control input of the evaporative stop relay 64, thereby leaving the switch in the evaporative stop relay closed, continuing operation of the evaporative cooler 10.

However, should the duct temperature be in excess of the limit duct temperature current *will* be supplied to the control of the evaporative stop relay 64 and the switch in the evaporative stop relay will open, thereby disconnecting power from the evaporative fan and evaporative pump relays 60 and 62, and stopping the evaporative cooler 10, closing the evaporative duct and opening the refrigerated duct by the duct valve 32 and closing the vent valve 52. Power will be connected to the controls of the refrigerated compressor and refrigerated fan relays, thereby starting the refrigerated cooler 16. Therefore, with the selector switch at terminal number 3, both the evaporative and refrigerated coolers are operated according to outside conditions.

With the selector switch 58 connected to terminal number 4, when the space temperature exceeds the desired space temperature, current will be connected through terminal number 4 to the controls of the refrigerated compressor relay 70 and the refrigerated fan relay 72, thereby starting the refrigerated cooler 16, leaving the refrigerated duct open, the evaporative duct closed, and valves 46 and 52 closed. Therefore, with the selector switch at terminal number 4, only the refrigerated cooler is operated.

Thus, it may be seen that my invention permits operation of the evaporative fan 12, evaporative cooler 10 and refrigerated cooler 16 in either of four modes, i.e., (1) operation of the fan 12 by the space thermostat 54 independent of the other units, (2) operation of the evaporative cooler 10 inclusive of the wetting period by the space thermostat 54 independent of the refrigerated cooler 16, (3) operation of the evaporative cooler 10 or refrigerated cooler 16 alternatively according to the relative humidity and temperature of the outside air, and (4) operation of the refrigerated cooler 16 by the space thermostat independently of the evaporative cooler 10.

Figure 3:
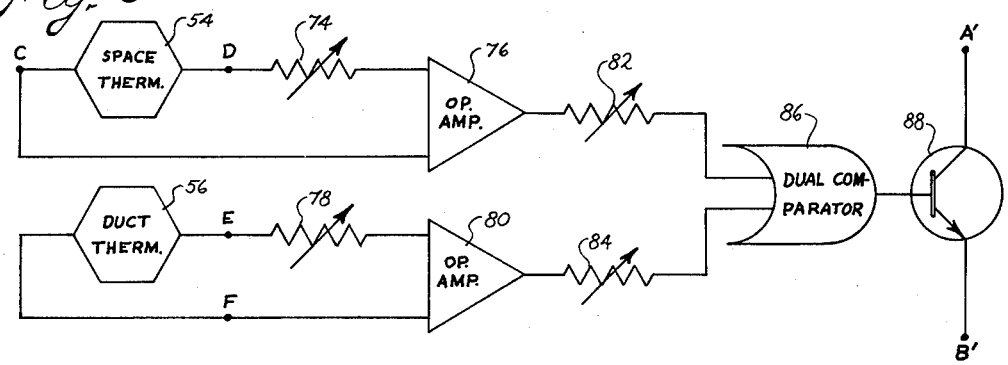
FIG. 3 is an electrical block diagram of a second embodiment of my invention to be connected to the electrical circuit described in FIG. 2.

For the second embodiment of my invention, the circuitry shown in FIG. 3 is connected to the circuitry shown in FIG. 2 as follows. The connections denoted as C and D in FIG. 3 are connected at the connections denoted as C and D in FIG. 2. The terminals A and B in FIG. 2 are disconnected and the terminals A' and B' of FIG. 3, are connected where A and B in FIG. 2 were previously connected. The duct thermostat is relocated such that the old connections A and B of the duct thermostat in FIG. 2 are now connected at terminals E and F in FIG. 3. One with ordinary skill in the art could easily form these connections to use and make the invention.

It should be noted that although the thermostats employed with the first embodiment could be simple bimetallic switching or mercury thermostats, etc., the thermostats required in connection with the second embodiment must be thermostats which provide a continuous reading of the temperatures involved to enable a continuous reading of the difference temperature for comparison with the limit difference temperature.

Referring to FIG. 3 the output of the space thermostat 54 is connected to an input of a variable resistor 74. The output of the variable resistor 74 is connected to an input of operational amplifier 76. The duct thermostat 60 and variable resistor 78 are connected in parallel with operational amplifier 80. The outputs of the operational amplifiers 76 and 80 and variable resistors 82 and 84 are connected in parallel to dual comparator 86 as shown in FIG. 3. The output of the dual comparator 86 is connected to the base of transistor 88. The collector of transistor 88 is connected to terminal A', which is connected to the output of the cool down relay 65. The emitter of transistor 88 is connected to terminal B' which is connected to the control input of evaporative stop relay 64. All other circuitry and the connection of the elements thereto, with the exception of that described above, is identical to that shown in FIG. 2.

Thus, the functioning of the second embodiment with the elements connected to the circuitry as described may be seen to occur as follows. The functioning of the system when the selector switch 58 is in the first, second or fourth terminals may be seen to be the same as that described with regard to the first embodiment.

With the selector switch 58 at terminal number 3, when the space temperature exceeds a desired space temperature current is connected through terminal number 3 to the evaporative fan 12, duct valve 32, vent valve 52 and evaporative pump 14 as described with respect to the first embodiment. The evaporative cooler 10 will operate as described in the first embodiment for the duration of the cool down period. At the expiration of the cool down period, the cool down relay 68 will close the switch in the cool down relay 68, thereby connecting power to terminal A'. If the space temperature, as sensed by the space thermostat 54 and amplified by the operational amplifier 76, exceeds the duct temperature, as sensed by the duct thermostat 56 and amplified by the operation amplifier 80, by a sufficient amount such that the dual comparator 86 outputs an insufficient current to activate the transistor 88, sufficient current will not be supplied to the control of the evaporative stop relay 64 to disconnect the switch therein, and the evaporative cooler 10 will continue to operate.

However, if the output of the operational amplifier 76 does not exceed the output of the operational amplifier 80 sufficiently, and a sufficient current to activate the transistor 88 is produced, sufficient current will be supplied to the control of the evaporative stop relay to open the switch therein and the evaporative cooler 10 will be stopped. The refrigerated cooler will be started as described previously with the respect to the first embodiment.

Therefore, the construction and functioning of the first two embodiments has been demonstrated. It will be understood that both the space thermostat and duct thermostat and the variable resistors 82, 84, 74 and 78 may be adjusted so as to allow the setting of any desired limit difference temperature, limit space temperature or limit duct temperature. Thus, the greater efficiency and operation of my invention has been demonstrated.

The third embodiment is described in FIGS. 4 and 5. Evaporative cooler 110 is an ordinary evaporative cooler having an evaporative cooler fan 112 which draws air through pads (not shown) which are soaked with water pumped by evaporative pump 114 from a sump (not shown). As stated before, those with ordinary skill in the art are very familiar with the operation and structure of evaporative coolers.

Evaporative duct 116 connects the evaporative cooler 110 to cooled space 118. By a cooled space, I mean that air within a contiguous volume such as a room or house. The evaporative duct 116 forms a duct or connection of the cooler 110 to the cooled space 118.

Duct valve 120 is mounted within the evaporative duct 116. The duct valve is an electrically controlled valve connected to delay control 122. The duct valve 120 provides for blocking the evaporative duct 116 when the evaporative fan 112 is not operating and opening the evaporative duct 116 when the evaporative fan 112 is operating. Evaporative intake 124 connects the evaporative cooler to outside air 126. As before, outside air is defined herein as that air outside the cooled space, which will be understood to include the air in attics or basements and the like.

As with the first and second embodiments, when the evaporative cooler 110 is operating, outside air 126 is intaked and exhausted into cooled space 118. Therefore, for effective transfer of air to take place from the outside air 122 to the cooled space 118 there must be some pressure relief means for venting air from the cooled space.

Exhaust vent 128 has a pressure relief vent valve 132 therein. The vent valve 132 opens the exhaust vent 128 when the pressure within the cooled space 118 exceeds a given pressure. The given pressure is that pressure sufficient to permit adequate ventilation of the cooled space 118 during operation at the cooler 110, but not so great as to open the exhaust vent 128 for pressures from other sources.

Exhaust vent 134 is an alternative or additive to the exhaust vent 128. The exhaust vent 134 has electrically controlled vent valve 138 therein. The electrically controlled vent valve 138 is controlled by the delay control 122, such that the vent valve 138 is open when the evaporative fan 112 is operating and closed at all other times. Thus, the exhaust vent 134 provides for more positive control over opening and closing than does the exhaust vent 128.

The cooled space 118 has space thermostat 140 therein. The space thermostat 140 electrically transmits temperature data to the delay control 122. For this embodiment a simple contact switch type of thermostat may be employed. The delay control 126 and space thermostat 140 provide a means for initiating cooling responsive to temperature of the cooled space.

As explained previously it is desirable to soak the pads of an evaporative cooler by starting the pump and operating it for a wetting period before starting the evaporative fan. Therefore, the delay control 122 performs the additional function of delaying the starting of the evaporative fan 112 for the wetting period after the space thermostat 140 has sensed that the space temperature has exceeded the limit space temperature. The delay 122 control also performs the functions of opening the duct valve 120 and opening the vent valve 138.

Referring to FIG. 5, an electrical block diagram of the third embodiment may be seen. Fan start relay 142 is a single pole time delay relay with the delay period set as the wetting period. The input of the fan start relay 142 is connected to 115v AC power. The output of the fan start relay 142 is connected to the inputs of the evaporative fan 112, the duct valve 120 and the vent valve 138. Pump start relay 144 is a single pole relay.

The input of the pump start relay 144 is also connected to the 115v AC power source. The output of the pump start relay 144 is connected to the input of the evaporative pump 114. The control input of the pump start relay 144 is connected to the output of the space thermostat 140.

The input of the space thermostat 140 is connected to 120v AC or 24v AC power source. The control output of the pump start relay 144 is connected to the control input of the fan start relay 142. The control output of the fan start relay 142 is connected to neutral lead "N", as shown in the FIG. 5.

Thus, with the elements and circuits constructed as described the following functioning may be seen to occur. The space thermostat 140 senses the space temperature. If the space temperature is below the limit space temperature no current is supplied to the control inputs of the relays 142 and 144 and no cooling is initiated. If the space temperature exceeds the limit space temperature the space thermostat 140 will supply current to the controls of the fan start relay 142 and the pump start relay 144. Simultaneous with the initiation of cooling by the space thermostat 140 the switch in the pump start relay 144 will close, thereby, starting the evaporative pump and wetting the pads. The delay element of the fan start relay 142 will delay closing of the switch in the fan start relay 142 for the duration of the wetting period.

After the expiration of the wetting period, the switch in the fan start relay 142 will close, thereby starting the evaporative fan 112, opening the duct valve 120, and opening the vent valve 138. Air will be intaked into the evaporative cooler 110 through evaporative intake 124 and exhausted through the duct 116 into the cooled space. The air displaced by the exhaust of the evaporative cooler 110 will be vented through either or both of the exhaust vent 128 and exhaust vent 134.

After the temperature of the cooled space is lowered below the limit space temperature, the current will be disconnected by the space thermostat from the controls of the relays 142 and 144 and cooling will be stopped. The vent valves 132 and 138 will close and the duct valve 120 will close, thereby insuring that no warm air enters the cooled space from these sources.

Thus, it may be seen that my invention in the form of the third embodiment employs the evaporative cooler 110 to cool the cooled space 118.

As an aid to correlating the terms of the claims to the exemplary drawing, the following catalog of elements is provided:

| | | | |
|---|---|---|---|
| 10 | evaporative cooler | 68 | cool down relay |
| 12 | evaporative fan | 70 | refrig. compressor relay |
| 14 | evaporative pump | 72 | refrig. fan relay |
| 16 | refrigerated cooler | 74 | variable resistor, space |
| 18 | refrigerated fan | 76 | operational amp., space |
| 20 | refrig. compressor | 78 | variable resistor, duct |
| 22 | evaporative duct | 80 | operational amp., duct |
| 24 | refrigerated duct | 82 | variable resistor |
| 26 | common duct | 84 | variable resistor |
| 28 | cooled space | 86 | dual comparitor |
| 30 | outside air | 88 | transistor |
| 32 | duct valve | 110 | evaporative cooler |
| 34 | selection control | 112 | evaporative fan |
| 36 | intake vent | 114 | evaporative pump |
| 38 | refrigerated intake | 116 | evaporative duct |
| 40 | evaporative intake | 118 | cooled space |
| 42 | exhaust vent, pressure | 120 | duct valve |
| 46 | pressure relief vent v | 122 | delay control |
| 48 | exhaust vent, elec. | 124 | evaporative intake |
| 52 | elec. controlled vent v | 126 | outside air |
| 54 | space thermostat | 128 | exhaust vent, pressure |
| 56 | duct thermostat | 132 | pressure relief vent v |
| 58 | selector switch | 134 | exhaust vent, elec. |
| 60 | evaporative fan relay | 138 | elec. controlled vent v |
| 62 | evap. pump relay | 140 | space thermostat |
| 64 | evap. stop relay | 142 | fan start relay |
| 66 | vap. start relay | 144 | pump start relay |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific examples above do not point out what an infringement of this patent would be, but are to enable the reader to make and use the invention.

I claim as my invention:

1. In an air conditioning system having
   a. an evaporative cooler which uses outside air from outside the cooled space,
   b. a refrigerated cooler,
   c. a cooled space,
   d. at least one duct connecting each of said coolers to the cooled space, and
   e. a space thermostat providing means for sensing space temperature of said cooled space;
the improved structure comprising in combination with the above:
   f. initiation means for initiating cooling when said space temperature exceeds a limit space temperature, including
   g. switching means for switching between said evaporative cooler and said refrigerated cooler responsive to the effectiveness of the evaporative cooler as it responds to relative humidity of outside air and temperature of outside air.

2. The invention as defined in claim 1 further comprising:
   h. an exhaust vent for venting air from said cooled space, space,
   j. a vent valve in the vent being connected to said initiation means,
   k. said initiation means additionally providing for
      (i) opening said vent valve when an evaporative fan of evaporative cooler is operating, and
      (ii) closing said vent valve when said evaporative fan is not operating.

3. The invention as defined in claim 1 further comprising:
   h. an exhaust vent for venting air from said cooled space, and
   j. said exhaust vent having a pressure relief vent valve therein.

4. The invention as defined in claim 1 further comprising:
   h. said initiation means also providing for delaying the stopping of said evaporative cooler and the starting of said refrigerated cooler for a cool down period after each initiation of cooling.

5. The invention as defined in claim 1 further comprising:
   h. said evaporative cooler including
      (i) an evaporative fan, and
      (ii) an evaporative pump,
   j. said initiation means also providing for delaying starting of said evaporative fan a wetting period after starting of said evaporative pump.

6. The invention as defined in claim 1 further comprising:
   h. said duct being a common duct interconnecting said cooled space and both of said coolers,
   j. at least one duct valve providing means for blocking the connection of one of said coolers to said common duct when the other of said coolers is operating, and
   k. said duct thermostat being in the connection of said evaporative cooler.

7. The invention as defined in claim 1 wherein said initiation means further comprises:
   h. a selection control connected to said space thermostat,
   j. a duct thermostat providing means for sensing duct temperature of air from said evaporative cooler,
   k. said duct thermostat connected to said selection control, and
   m. said selection control providing means for sensing a difference temperature,
   n. said difference temperature being the difference between said space temperature and said duct temperature,
   o. said selection control additionally providing control means for
      (i) starting said evaporative cooler when said difference temperature exceeds a limit difference temperature,
      (ii) stopping said evaporative cooler when said difference temperature does not exceed said limit difference temperature, and
      (iii) starting said refrigerated cooler when said difference temperature does not exceed said limit difference temperature, all when said space temperature exceeds said limit space temperature, and
      (iv) stopping each of said coolers when said space temperature is below said limit space temperature.

8. The invention as defined in claim 7 further comprising:
   p. said evaporative cooler including
      (i) an evaporative fan, and
      (ii) an evaporative pump,
   q. said selection control having manually controlled selector switch means for (i) operating said evaporative fan to the exclusion of said evaporative pump and said refrigerated cooler, (ii) operating said evaporative cooler to the exclusion of said refrigerated cooler, (iii) operating said evaporative and refrigerated coolers alternatively with said switching means, and (iv) operating said refrigerated cooler exclusive of said evaporative cooler, in combination with the following electrical circuit of said selection control, r. said electrical circuit of said selection control including (i) electric switch means for connecting an output of said space thermostat to one of four terminals, (ii) said terminals including a first terminal, a second terminal, a third terminal and a fourth terminal, (iii) said first terminal being connected to a starter for said evaporative fan, (iv) pump start means for connecting said second terminal to a starter for said evaporative pump, (v) fan start means for connecting said starter for said evaporative fan through said starter for said evaporative pump to said pump start means, (vi) said fan start means also providing the function of disconnecting said pump start means from said starter for said evaporative fan when electrical current is connected through said fan start means, (vii) evaporative start means for connecting said third terminal to said pump start means, (viii) thermal select means for connecting an electrical current from
an input of said thermal select means to
an output of said thermal select means
when said difference temperature does not exceed said limit difference temperature, (ix) thermostat connection means for connecting an output of said space thermostat to said input of said thermal select means, (x) evaporative start means for connecting a starter for said evaporative cooler to said output of the space thermostat, (xi) said evaporative start means also performing the function of disconnecting said starter for said evaporative cooler from said output of said space thermostat responsive to current at said output of said thermal select means, and (xii) refrigerated start means for connecting said output of said thermal select to a starter for said refrigerated cooler, (xiii) refrigerated start means for connecting said output of said thermal select means to at least one starter for said refrigerated cooler, (xiv) said refrigerated start means also providing the function of connecting said fourth terminal to said starter for said refrigerating cooler, s. space connection means for connecting said space thermostat to space amplifier means for amplifying said space temperature, t. duct connection means for connecting said duct thermostat to duct amplifier means for amplifying said duct temperature, u. said space connection means and said duct connection means being such that the values of said amplified space temperature and said amplified duct temperature may be electrically altered, v. amplifier connection means for connecting said duct amplifier means and said space amplifier means to comparature means for permitting current to flow from said input to said thermal select means to an output of said thermal select means, w. said amplifier connection means being such that the relative values of said amplified duct temperature and said amplified space temperature may be altered, x. refrigerated delay means interposed between said duct connection means and said duct thermostat for delaying the connection of current through said duct thermostat for a delay interval after electrical current has been connected to said refrigerated delay means, and y. said fan start means also providing a function of delaying the starting of said evaporative fan a wetting period after electrical current is applied thereto.

9. The invention as defined in claim 1 wherein said initiation means further comprises:

h. a selection control connected to said space thermostat, j. a duct thermostat providing means for sensing duct temperature of air from said evaporative cooler, k. said duct thermostat being connected to said selection control, m. said selection control providing control means for
(i) starting said evaporative cooler when said duct temperature does not exceed a limit duct temperature,
(ii) stopping said evaporative cooler when said duct temperature exceeds said limit duct temperature, and
(iii) starting said refrigerated cooler when said duct temperature exceeds said limit duct temperature,
all when said space temperature exceeds said limit space temperature, and
(iv) stopping each of said coolers when the space temperature is below said limit space temperature.

10. The invention as defined in claim 9 further comprising:

n. said evaporative cooler including
(i) an evaporative fan, and
(ii) an evaporative pump, o. said selection control having manually controlled selector switch means for
(i) operating said evaporative fan to the exclusion of said evaporative pump and said refrigerated cooler,
(ii) operating said evaporative cooler exclusion of said refrigerated cooler,
(iii) operating said evaporative and refrigerated coolers alternatively with said switching means, and
(iv) operating said refrigerated cooler exclusive of said evaporative cooler, in combination with an electrical circuit in said selection control, p. said electrical circuit in said selection control including
(i) selector switch means for connecting an output side of said space thermostat to one of four terminals, (ii) said terminals including a first terminal, a second terminal, a third terminal and a fourth terminal, (iii) said first terminal being connected to a starter for said evaporative fan, (iv) pump start means for connecting said second terminal to a starter for said evaporative pump, (v) fan start means for connecting said starter for said evaporative fan through said starter for said evaporative pump to said pump start means, (vi) said fan start means also providing the function of disconnecting said pump start means from said starter for said evaporative fan when an electrical current is connected through said fan start means, (vii) evaporative start means for connecting said third terminal to said pump start means, (viii) duct connection means for connecting said third terminal to an input of said duct thermostat, (ix) duct control means for disconnecting said duct connections and evaporative connection means when an electrical current is not flowing from said third terminal, (x) refrigerated start means for connecting said output of said duct thermostat to at least one starter for said refrigerated cooler, and (xi) said refrigerated start means also providing the function of connecting an electrical current through said fan control means, thereby disconnecting power from said starter for said evaporative fan when an electrical current is connected to said starter for said refrigerated cooler, q. refrigerated delay means interposed between said duct connection means and said duct thermostat for delaying the connection of current through said duct thermostat for a delay interval after electrical current has been connected to said refrigerated delay means, and r. said fan start means also providing a function of delaying the starting of said evaporative fan a wetting period after electrical current is applied thereto.

11. The improved method for cooling a cooled space having
   a. an evaporative cooler which uses air from outside the cooled space,
   b. a refrigerated cooler,
   c. said refrigerated and evaporative coolers being connected by a duct to said cooled space, and
   d. a space thermostat providing means for sensing space temperature of the cooled space;
comprising the combined steps of:
   e. initiating cooling of said cooled space responsive to the space temperature thereof,
   f. setting a limit duct temperature,
   g. sensing duct temperature of air from said evaporative cooler,
   h. determining if the sensed duct temperature is above or below the limit duct temperature, and
   j. switching between the evaporative cooler and refrigerated cooler by
      (i) starting the evaporative cooler and stopping the refrigerated cooler when said duct temperature is below the limit duct temperature, and
      (ii) starting the refrigerated cooler and stopping the evaporative cooler when said duct temperature exceeds said limit duct temperature.

12. The invention as defined in claim 11 further comprising:
   m. delaying the switching from said evaporative cooler to said refrigerated cooler a cool down period after said initiation step, and
   n. delaying starting of an evaporative fan of said evaporative cooler a wetting period after starting of an evaporative pump of said evaporative cooler.

13. The invention as defined in claim 12 further comprising:
   o. opening a vent valve for venting air from said cooled space when said evaporative fan is operating, and
   p. closing said vent valve when said evaporative fan is not operating,
   q. blocking the connection of said refrigerated cooler to said cooled space when said refrigerated cooler is not operating and an evaporative fan is operating,
   r. blocking the connection of said evaporative cooler to said cooled space when the evaporative fan of said evaporative cooler is not operating,
   s. opening the connection of said refrigerated cooler to said cooled space when said refrigerated cooler is operating, and
   t. opening the connection of said evaporative cooler to said cooled space when said evaporative fan is operating.

14. The improved method for cooling a cooled space having
   a. an evaporative cooler which uses air from outside the cooled space,
   b. a refrigerated cooler,
   c. said refrigerated and evaporative coolers being connected by a duct to said cooled space, and
   d. a space thermostat providing means for sensing space temperature of the cooled space;
comprising the combined steps of:
   e. initiating cooling of said cooled space responsive to the space temperature thereof,
   f. setting a limit difference temperature,
   g. sensing duct temperature of air from said evaporative cooler,
   h. comparing said duct temperature and said space temperature, thereby
   j. sensing a difference temperature which is a difference result of said comparing step, and
   k. determining if the sensed difference temperature is above or below the limit difference temperature, and
   m. switching between the evaporative cooler and refrigerated cooler by
      (i) starting said evaporative cooler and stopping said refrigerated cooler when said difference temperature is above the limit difference temperature, and
      (ii) starting said refrigerated cooler and stopping said evaporative cooler when said difference temperature is below said limit difference temperature.

15. The invention as defined in claim 14 further comprising:
   o. delaying the switching from said evaporative cooler to said refrigerated cooler a cool down period after said initiation step, and
   p. delaying starting of an evaporative fan of said evaporative cooler a wetting period after starting of an evaporative pump of said evaporative cooler.

16. The invention as defined in claim 15 further comprising:
- q. opening a vent valve for venting air from said cooled space when said evaporative fan is operating, and
- r. closing said vent valve when said evaporative fan is not operating,
- s. blocking the connection of said refrigerated cooler to said cooled space when said refrigerated cooler is not operating and an evaporative fan is operating,
- t. blocking the connection of said evaporative cooler to said cooled space when the evaporative fan of said evaporative cooler is not operating,
- u. opening the connection of said refrigerated cooler to said cooled spacen when said refrigerated cooler is operating, and
- v. opening the connection of said evaporative cooler to said cooled space when said evaporative fan is operating.

17. The improved method for cooling a cooled space having
- a. an evaporative cooler which uses air from outside the cooled space,
- b. a refrigerated cooler,
- c. said refrigerated and evaporative coolers being connected by a duct to said cooled space, and
- d. a space thermostat providing means for sensing space temperature of the cooled space;

comprising the combined steps of:
- e. initiating cooling of said cooled space responsive to the space temperature thereof, and
- f. switching between the evaporative cooler and refrigerated cooler responsive to the effectiveness of the evaporative cooler as it responds to relative humidity of outside air and temperature of outside air.

* * * * *